United States Patent
Kuwahara et al.

(10) Patent No.: US 10,234,746 B2
(45) Date of Patent: Mar. 19, 2019

(54) LENS BARREL

(71) Applicant: Panasonic Intellectual Property Management Co., Ltd., Osaka (JP)

(72) Inventors: Takumi Kuwahara, Nara (JP); Koichi Muramatsu, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 521 days.

(21) Appl. No.: 14/945,480

(22) Filed: Nov. 19, 2015

(65) Prior Publication Data

US 2016/0077408 A1 Mar. 17, 2016

Related U.S. Application Data

(63) Continuation of application No. PCT/JP2014/002580, filed on May 16, 2014.

(30) Foreign Application Priority Data

May 21, 2013 (JP) ................. 2013-106881

(51) Int. Cl.
  *G02B 15/14* (2006.01)
  *G02B 7/02* (2006.01)
  (Continued)

(52) U.S. Cl.
  CPC ............ *G03B 17/04* (2013.01); *G02B 7/021* (2013.01); *G02B 7/023* (2013.01); *G02B 7/10* (2013.01);
  (Continued)

(58) Field of Classification Search
  CPC ........ G02B 7/10; G02B 15/173; G02B 7/102; G02B 7/021; G02B 25/002; G02B 7/023; G02B 7/04; G11B 7/0932; G03B 17/02
  (Continued)

(56) References Cited

U.S. PATENT DOCUMENTS 7,620,306 B2 * 11/2009 Santo .................... G03B 17/04
  359/676
2010/0002316 A1 1/2010 Nomura

FOREIGN PATENT DOCUMENTS

JP  6-035051  2/1994
JP  11-282073  10/1999
(Continued)

OTHER PUBLICATIONS

International Search Report dated Jul. 15, 2014 in International (PCT) Application No. PCT/JP2014/002580.

*Primary Examiner* — Dawayne Pinkney

(74) *Attorney, Agent, or Firm* — Wenderoth, Lind & Ponack, L.L.P.

(57) ABSTRACT

A lens barrel of this technique includes a movable lens barrel unit section, and a master flange unit having a lens unit, and is switched between a collapsed state where the movable lens barrel unit section is stored in the master flange unit and an extended state where the movable lens barrel unit section is extended from the master flange unit. The master flange unit has a moving frame supported to be movable in an optical axis direction via a first elastic member extendable in the optical axis direction, and a lens frame supported to be movable in the optical axis direction via a second elastic member extendable in the optical axis direction relative to the moving frame. In the collapsed state, the movable lens barrel unit section presses the lens frame such that the moving frame and the lens frame get closer to the master flange against repulsive forces of the first elastic member and the second elastic member.

9 Claims, 11 Drawing Sheets

(51) Int. Cl.
  *G03B 17/00* (2006.01)
  *G03B 17/04* (2006.01)
  *G02B 7/10* (2006.01)
  *G03B 5/00* (2006.01)
  *G03B 3/10* (2006.01)
  *G02B 27/64* (2006.01)
  *G03B 17/12* (2006.01)

(52) U.S. Cl.
  CPC ........... *G02B 7/102* (2013.01); *G02B 27/646* (2013.01); *G03B 3/10* (2013.01); *G03B 5/00* (2013.01); *G03B 17/12* (2013.01); *G03B 2205/0092* (2013.01)

(58) Field of Classification Search
  USPC .............. 359/896, 889, 892, 507, 513, 514, 359/694–704, 811–830, 706; 396/72, 75, 396/535, 542, 445–446, 451–452, 396/458–460, 505
  See application file for complete search history.

(56) References Cited

FOREIGN PATENT DOCUMENTS

| | | |
|---|---|---|
| JP | 2002-90611 | 3/2002 |
| JP | 2004-163810 | 6/2004 |
| JP | 2006-317809 | 11/2006 |
| JP | 2008-170730 | 7/2008 |
| JP | 2010-015055 | 1/2010 |
| JP | 2011-154113 | 8/2011 |
| JP | 2013-47752 | 3/2013 |

\* cited by examiner

LENS BARREL

BACKGROUND

1. Technical Field

This technique relates to a lens barrel used in cameras such as digital cameras.

2. Description of the Related Art

Unexamined Japanese Patent Publication No. 2013-47752 discloses a lens barrel to be switched between one mode in which a lens group is collapsed and the other mode in which the lens group is extended to a predetermined position.

SUMMARY

A lens barrel of this technique includes a movable lens barrel unit section and a master flange unit having a lens unit, and is configured to be switched between a collapsed state in which the movable lens barrel unit section is stored in the master flange unit, and an extended state in which the movable lens barrel unit section is extended from the master flange unit. The master flange unit includes a moving frame supported to be movable in an optical axis direction via a first elastic member extendable in the optical axis direction relative to a master flange orthogonal to an optical axis, and a lens frame supported to be movable in the optical axis direction via a second elastic member extendable in the optical axis direction relative to the moving frame and holding a lens of the lens unit. In the collapsed state, the movable lens barrel unit section presses the lens frame such that the moving frame and the lens frame get closer to the master flange against repulsive forces of the first elastic member and the second elastic member.

DETAILED DESCRIPTION

A lens barrel having a collapsed configuration in accordance with an exemplary embodiment of this technique will be described below with reference to drawings. However, unnecessary detailed description may be omitted. For example, detailed description of well-known matters and duplicated description of the same structure may be omitted. This serves to avoid unnecessary redundant description and facilitate understanding for those skilled in the art.

Inventors intend to present appended drawings and following description so as to facilitate thorough understanding of this technique for those skilled in the art, and do not intend to limit subject matters recited in claims.

[1. Description of Configuration of Lens Barrel]

Figure 1:
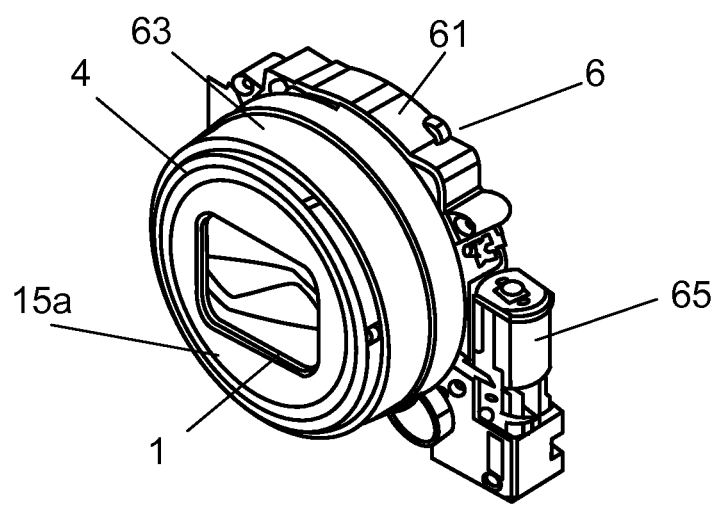
FIG. 1 is a perspective view illustrating the appearance of a lens barrel in accordance with an exemplary embodiment of this technique.
Figure 2:
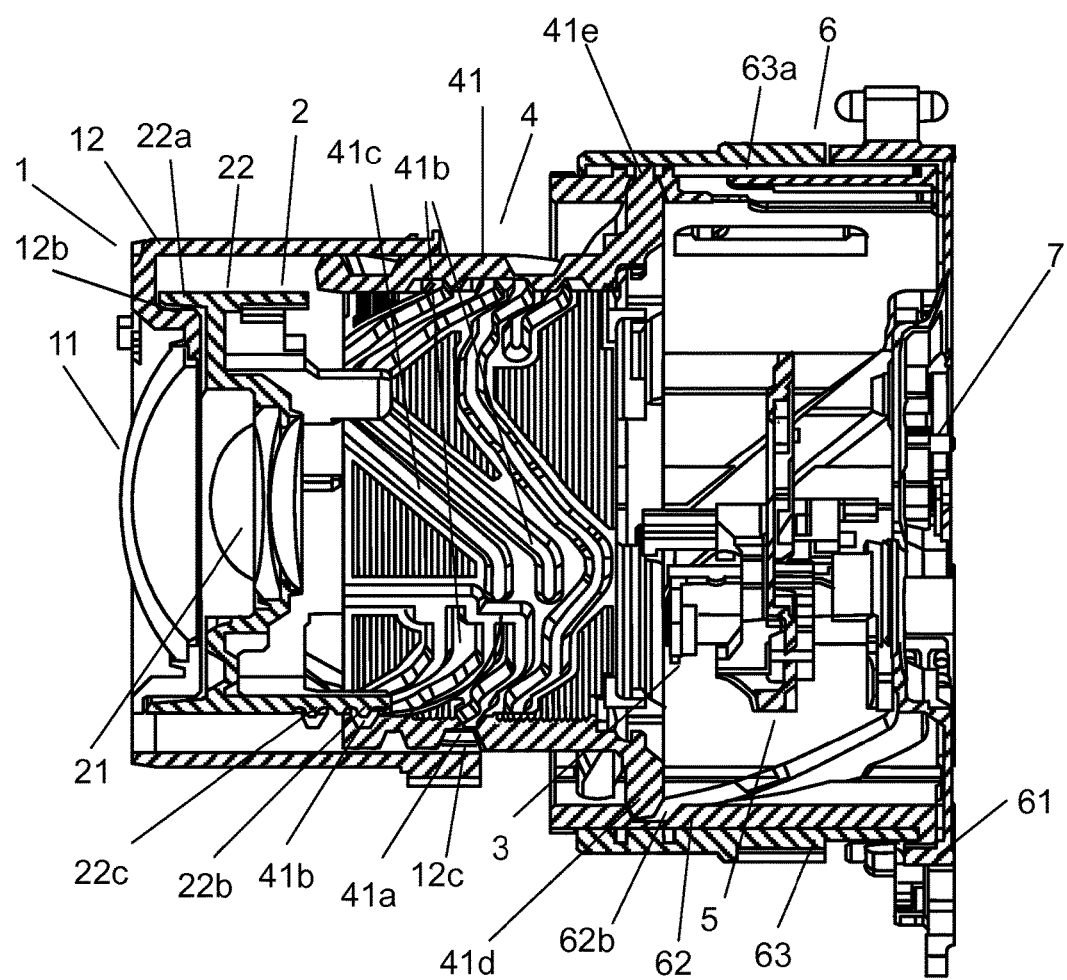
FIG. 2 is a sectional view illustrating the internal configuration of the lens barrel in accordance with this exemplary embodiment.
Figure 3:
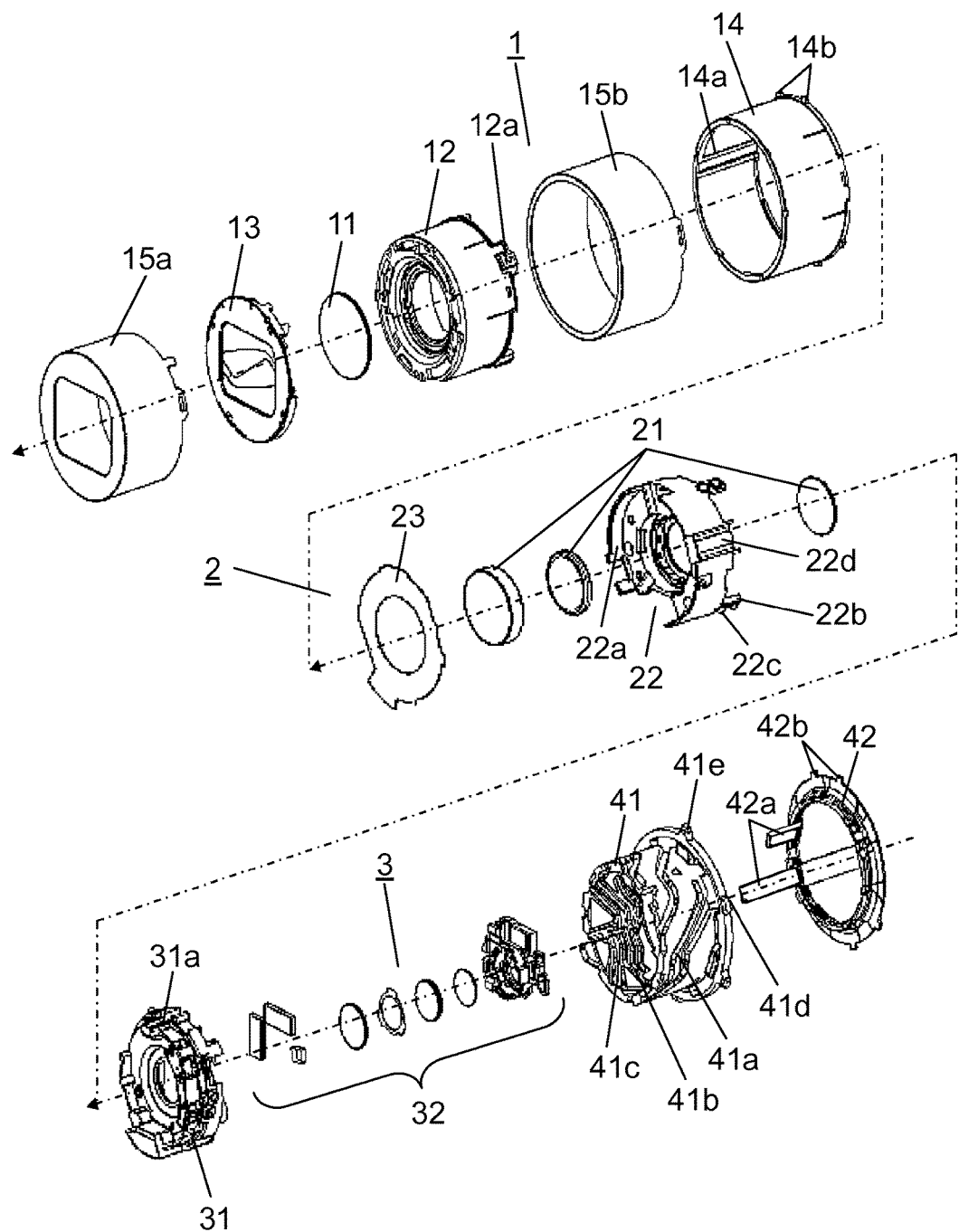
FIG. 3 is an exploded perspective view illustrating a configuration of a movable lens barrel unit section having a first group lens unit, a second group lens unit, and a third group lens unit in the lens barrel in accordance with this exemplary embodiment.
Figure 4:
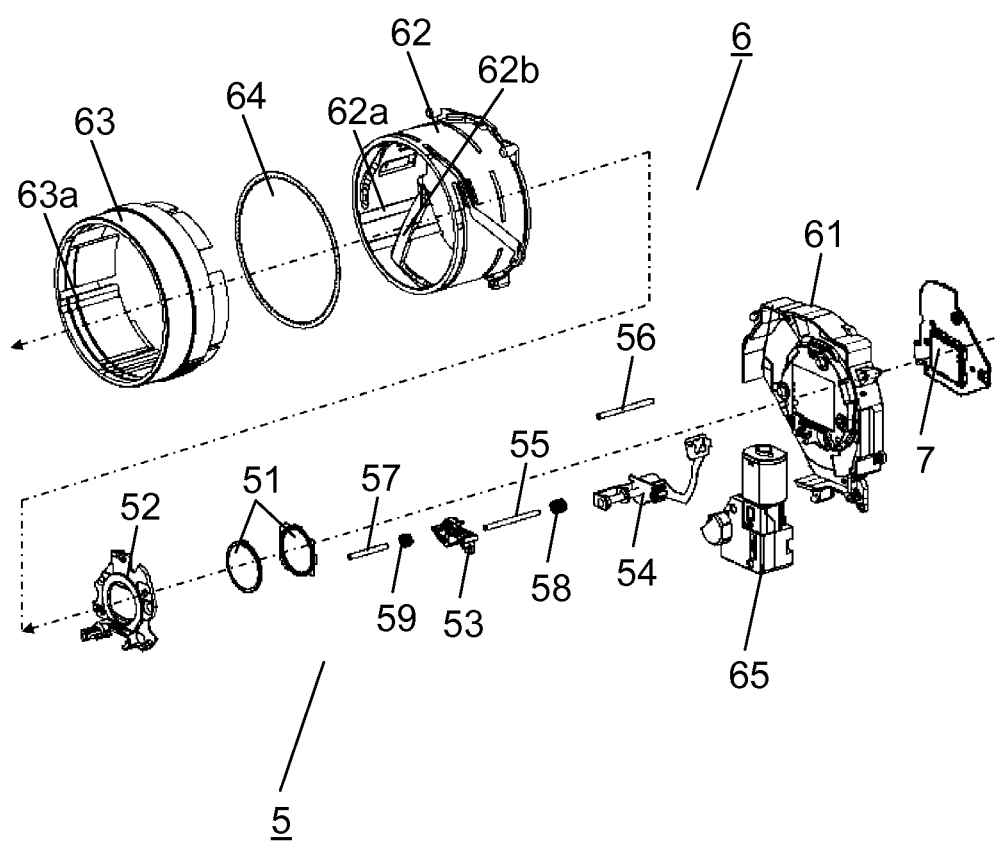
FIG. 4 is an exploded perspective view illustrating a configuration of a master flange unit in the lens barrel in accordance with this exemplary embodiment.
Figure 5:
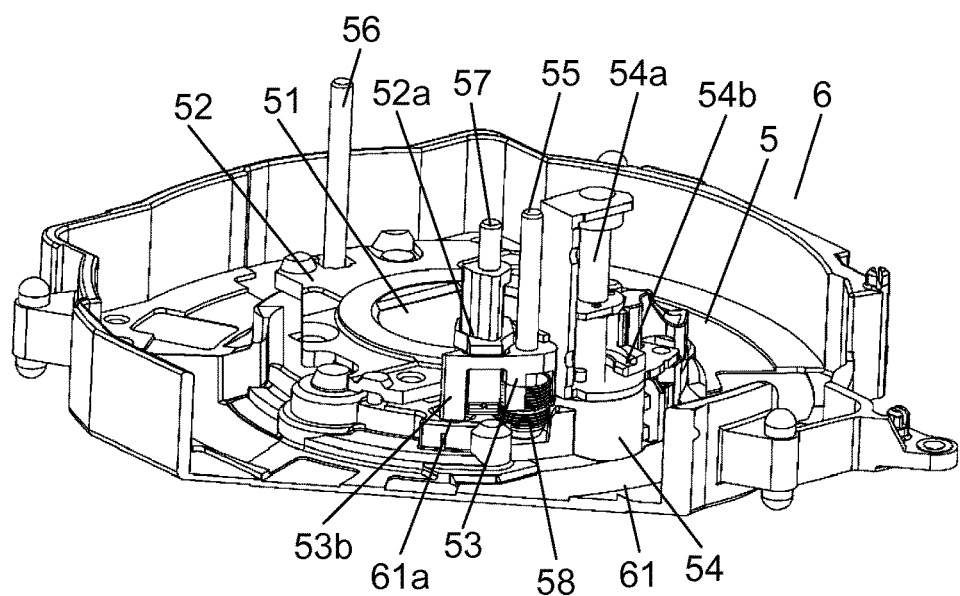
FIG. 5 is a perspective view illustrating a configuration of a fourth group lens unit in the collapsed state in the lens barrel in accordance with this exemplary embodiment.
Figure 6:
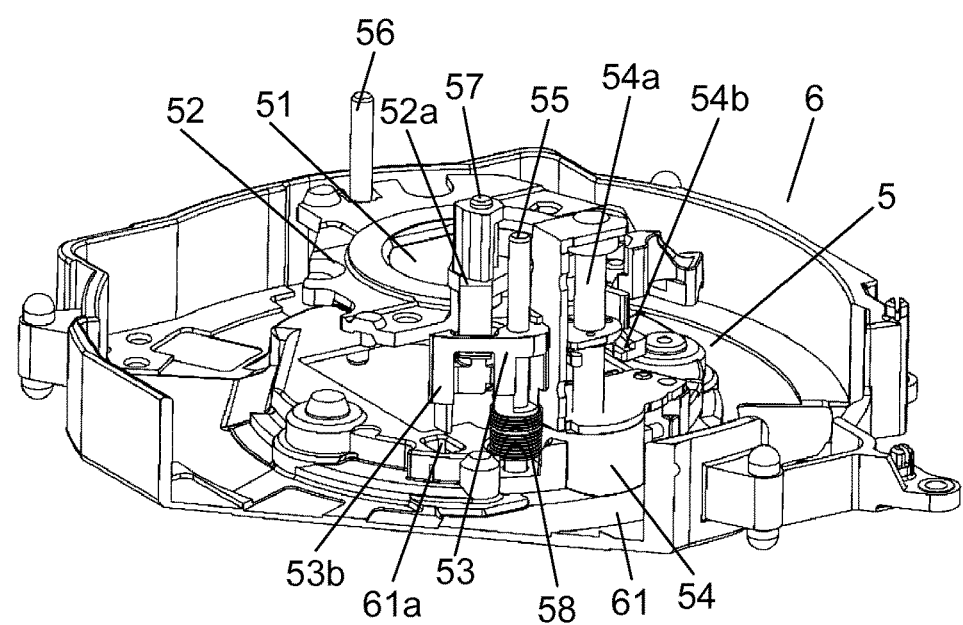
FIG. 6 is a perspective view illustrating a configuration of the fourth group lens unit in a state where the lens barrel is extended in accordance with this exemplary embodiment.
Figure 7:
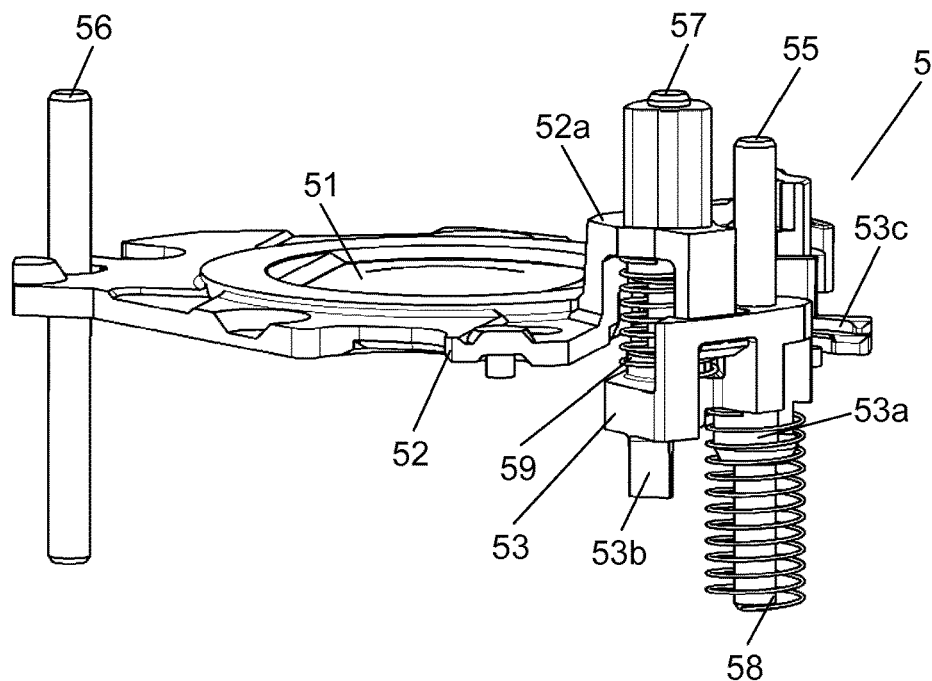
FIG. 7 is a perspective view illustrating the enlarged fourth group lens unit in the lens barrel in accordance with this exemplary embodiment.
Figure 8:
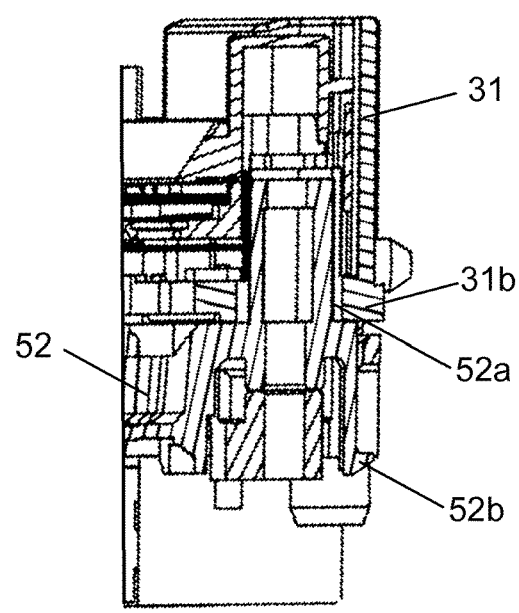
FIG. 8 is a sectional view illustrating the enlarged third group lens unit and the fourth group lens unit in the lens barrel in accordance with this exemplary embodiment.

FIG. 1 is a perspective view illustrating the appearance of a lens barrel in accordance with an exemplary embodiment of this technique. FIG. 2 is a sectional view illustrating the internal configuration of the lens barrel in accordance with this exemplary embodiment. FIG. 1 illustrates the lens barrel in a collapsed state, and FIG. 2 illustrates a state where the lens barrel is extended from the collapsed state. FIG. 3 is an exploded perspective view illustrating a configuration of a movable lens barrel unit section having a first group lens unit, a second group lens unit, and a third group lens unit in the lens barrel in accordance with this exemplary embodiment. FIG. 4 is an exploded perspective view illustrating a configuration of a master flange unit in the lens barrel in accordance with this exemplary embodiment. FIG. 5 is a perspective view illustrating a configuration of a fourth group lens unit in the collapsed state in the lens barrel in accordance with this exemplary embodiment. FIG. 6 is a perspective view illustrating a configuration of the fourth group lens unit in a state where the lens barrel is extended in accordance with this exemplary embodiment. FIG. 7 is a perspective view illustrating the enlarged fourth group lens unit in the lens barrel in accordance with this exemplary embodiment. FIG. 8 is a sectional view illustrating the enlarged third group lens unit and the fourth group lens unit in the lens barrel in accordance with this exemplary embodiment.

As illustrated in FIG. 1 to FIG. 4, the lens barrel is configured of movable lens barrel unit section 4 including zoom first group lens unit 1, zoom second group lens unit 2 disposed on the inner peripheral side of first group lens unit 1, and third group lens unit 3 for shake compensation; and master flange unit 6 including focus fourth group lens unit 5. Movable lens barrel unit section 4 is adapted to be switched between the collapsed state in which the lens barrel is stored in master flange unit 6 during non-use, and an extended state in which the lens barrel is extended from master flange unit 6 in an optical axis direction during use.

Master flange unit 6 has master flange 61 that is orthogonal to an optical axis, and imaging device 7 is attached to master flange 61.

[1-1. Configuration of First Group Lens Unit]

As illustrated in FIG. 2 and FIG. 3, first group lens unit 1 includes lens group 11 formed of two lenses, tubular first group lens frame 12 for holding lens group 11, barrier unit 13 disposed in front of lens group 11 (see FIG. 3), tubular first group rotation-limiting frame 14 having linear groove 14a in its inner peripheral face, groove 14a engaging with linear protrusion 12a formed on an outer peripheral face of first group lens frame 12 (see FIG. 3), and decorative frames 15a, 15b for storing lens group 11, first group lens frame 12, barrier unit 13, and rotation-limiting frame 14 (see FIG. 3).

[1-2. Configuration of Second Group Lens Unit]

As illustrated in FIG. 2 and FIG. 3, second group lens unit 2 includes lens group 21 formed of three lenses, tubular second group lens frame 22 for holding lens group 21, and protective sheet 23. Second group lens frame 22 has tip 22a externally engageable with limiting unit 12b formed on the inner side of the first group lens frame 12.

[1-3. Configuration of Third Group Lens Unit]

As illustrated in FIG. 3, third group lens unit 3 includes shutter unit 31 and OIS lens unit 32 having an OIS (Optical Image Stabilizer) lens for shake compensation, which is mechanically connected to shutter unit 31.

[1-4. Configuration of Movable Unit Section]

As illustrated in FIG. 2 and FIG. 3, movable lens barrel unit section 4 includes cam frame 41, and rotation-limiting frame 42 for limiting rotation of second group lens unit 2 and third group lens unit 3. Second group lens unit 2 and third group lens unit 3 are disposed on the inner peripheral side of cam frame 41 and rotation-limiting frame 42.

Cam frame 41 has a bayonet claw on its outer peripheral face, and a bayonet groove in its inner peripheral face. The bayonet claw on the outer peripheral face of cam frame 41 is engageable with a bayonet groove in the inner peripheral face of rotation-limiting frame 14, and the bayonet groove in the inner peripheral face of cam frame 41 is engageable with a bayonet claw on the outer peripheral face of rotation-limiting frame 42. In this manner, cam frame 41 can rotate while being prevented from moving in the optical axis direction relative to rotation-limiting frame 14 and rotation-limiting frame 42.

Cam frame 41 further has first cam groove 41a in its outer peripheral face, which is engageable with cam 12c on the inner peripheral face of a rear portion of first group lens frame 12. Cam frame 41 further has a plurality of second cam grooves 41b, 41c (three cam grooves 41b and three cam grooves 41c in this exemplary embodiment) on its inner peripheral face, which are engageable with at least two cams 22b, 22c on the outer peripheral face of a rear portion of second group lens frame 22. Cam 12c of first group lens frame 12 of first group lens unit 1 is engageable with first cam groove 41a of cam frame 41, and cam 12c can slidably move in first cam groove 41a. Cam 22b of second group lens frame 22 of second group lens unit 2 is engageable with second cam groove 41b of cam frame 41, and cam 22c is engageable with second cam grooves 41c. Cams 22b, 22c can slidably move in second cam grooves 41b, second cam grooves 41c, respectively.

Although not illustrated, cam frame 41 further has three cam grooves on its inner peripheral face, which are engageable with three cams on an outer peripheral face of shutter unit 31.

When cam frame 41 rotates relative to rotation-limiting frame 14, first group lens frame 12 of first group lens unit 1 moves in the optical axis direction while being prevented from rotating by rotation-limiting frame 14.

Rotation-limiting frame 42 has protrusion 42a linearly extending in the optical axis direction. Protrusion 42a is engageable with linear groove 22d in the outer peripheral face of second group lens frame 22. Thus, when cam frame 41 rotates relative to rotation-limiting frame 42, second group lens frame 22 moves in the optical axis direction while being prevented from rotating relative to rotation-limiting frame 42. Protrusion 42a of rotation-limiting frame 42 is engageable with groove 31a in an outer peripheral face of shutter unit 31. Thus, when cam frame 41 rotates relative to rotation-limiting frame 42, third group lens unit 3 along with shutter unit 31 moves in the optical axis direction while being prevented from rotating relative to rotation-limiting frame 42.

[1-5. Configuration of Master Flange Unit]

As illustrated in FIG. 2 and FIG. 4, master flange unit 6 includes fixed frame 62 fixed to master flange 61, rotational frame 63 that is rotatably disposed on the outer periphery of fixed frame 62 and is prevented from moving in the optical axis direction by fixed frame 62, and shading sheet 64 disposed on a subject side of fixed frame 62. Fixed frame 62 has a bayonet claw along the periphery of the optical axis on its outer peripheral face, and rotational frame 63 has a bayonet groove engaged with the bayonet claw. Thus, rotational frame 63 is rotatably disposed relative to fixed frame 62 while being prevented from moving in the optical axis direction.

Fixed frame 62 has three linear grooves 62a parallel to the optical axis in its inner peripheral face, and grooves 62a are engageable with protrusions 42b on the outer periphery of rotation-limiting frame 42 and protrusions 14b on the outer periphery of rotation-limiting frame 14. Thus, rotation-limiting frame 42 and rotation-limiting frame 14 are prevented from rotating relative to fixed frame 62. Protrusions 14b of rotation-limiting frame 14 engage with grooves 62a at a position closer to the subject than protrusions 42b of rotation-limiting frame 42. Fixed frame 62 has three cam grooves 62b in its inner peripheral face, and cam grooves 62b are engageable with cams 41d formed on the outer periphery of cam frame 41.

Rotational frame 63 has groove 63a in its inner peripheral face, and groove 63a is engageable with tip 41e formed on cam 41d of cam frame 41. Thus, when rotational frame 63 rotates, cam frame 41 rotates accordingly relative to fixed frame 62, and moves in the optical axis direction. As described above, since cam frame 41 is prevented from moving in the optical axis direction relative to rotation-limiting frame 14 and rotation-limiting frame 42, when cam frame 41 rotates relative to fixed frame 62 and moves in the optical axis direction, rotation-limiting frame 14 and rotation-limiting frame 42 move in the optical axis direction while being prevented from rotating relative to fixed frame 62.

Rotational frame 63 has a gear (not illustrated) on its outer periphery, which engages with a gear of zoom motor unit 65. When zoom motor unit 65 is driven, a rotational force of zoom motor unit 65 is transmitted through the gear to rotational frame 63, thereby rotating rotational frame 63.

[1-6. Configuration of Fourth Group Lens Unit]

As illustrated in FIG. 4 to FIG. 7, focus fourth group lens unit 5 disposed in master flange unit 6 includes fourth group lens frame 52 for holding lens group 51 formed of two focus lenses, moving frame 53 capable of moving in the optical axis direction relative to master flange 61 orthogonal to the optical axis, and focus motor unit 54 that is an actuator for moving fourth group lens frame 52 and moving frame 53 in the optical axis direction to perform focusing. Fourth group lens unit 5 has support shafts 55, 56, and 57, and moving frame 53 is supported by support shaft 55 press-fitted into master flange 61 so as to be movable in the optical axis direction. Fourth group lens frame 52 is supported by support shaft 56 press-fitted into master flange 61 and support shaft 57 press-fitted into moving frame 53 so as to be movable in the optical axis direction.

Between master flange 61 and moving frame 53, support shaft 55 is provided with coil spring 58 that is a first elastic member extendable in the optical axis direction relative to master flange 61. Thus, moving frame 53 is elastically supported so as to be movable in the optical axis direction relative to master flange 61. Between fourth group lens frame 52 and moving frame 53, support shaft 57 is provided with coil spring 59 that is a second elastic member extendable in the optical axis direction relative to moving frame 53. Thus, fourth group lens frame 52 is elastically supported so as to be movable in the optical axis direction relative to moving frame 53. Consequently, fourth group lens frame 52 is elastically supported by master flange 61 in two steps via moving frame 53 and coil springs 58, 59. That is, fourth group lens unit 5 gets closer to master flange 61 in the collapsed state as illustrated in FIG. 5, and fourth group lens unit 5 is extended away from master flange 61 in the used state as illustrated in FIG. 6.

Moving frame 53 has stopper 53a at a part movably supported by support shaft 55. Stopper 53a serves to come into contact with master flange 61 when moving frame 53 compresses coil spring 58, thereby preventing moving frame 53 from moving beyond a predetermined position.

Moving frame 53 has projection 53b enterable into opening 61a of master flange 61 (see FIG. 5 and FIG. 6). A photointerruptor that is a detection unit for detecting position of moving frame 53 is disposed in opening 61a of master flange 61, and the photointerruptor can detect whether or not moving frame 53 is located at a predetermined position based on insertion of projection 53b of moving frame 53 into opening 61a. In this exemplary embodiment, when projection 53b of moving frame 53 is inserted into opening 61a of master flange 61, and the photointerruptor detects projection 53b, it is determined that focus fourth group lens unit 5 moves to an origin point.

As illustrated in FIG. 5 to FIG. 7, moving frame 53 has projection 53c projecting toward focus motor unit 54 (see FIG. 7). Projection 53c is in contact with pressing member 54b engaged with rotational screw 54a of focus motor unit 54. By activating focus motor unit 54 to move pressing member 54b toward master flange 61, allowing pressing member 54b to press down projection 53c. Accordingly, moving frame 53 gets closer to master flange 61 while compressing coil spring 58. In this exemplary embodiment, a repulsive force of coil spring 58 is set smaller than a repulsive force of coil spring 59. For this reason, even a motor having a small torque can drive moving frame 53, achieving miniaturization of focus motor unit 54.

As illustrated in FIG. 7 and FIG. 8, fourth group lens frame 52 of fourth group lens unit 5 has contact 52a with which contact 31b of shutter unit 31 comes into contact. When lens barrel shifts to the collapsed state, shutter unit 31 gets closer to fourth group lens unit 5, and contact 31b comes into contact with contact 52a, thereby causing shutter unit 31 to press fourth group lens frame 52 of fourth group lens unit 5 onto master flange 61. At this time, fourth group lens frame 52 applies a force to compress coil spring 59. The force applied to coil spring 59 is transmitted to coil spring 58 via moving frame 53 to compress coil spring 58, resulting in that moving frame 53 of fourth group lens unit 5 gets closer to master flange 61.

[2. Description of Operation of Lens Barrel]

Figure 9:
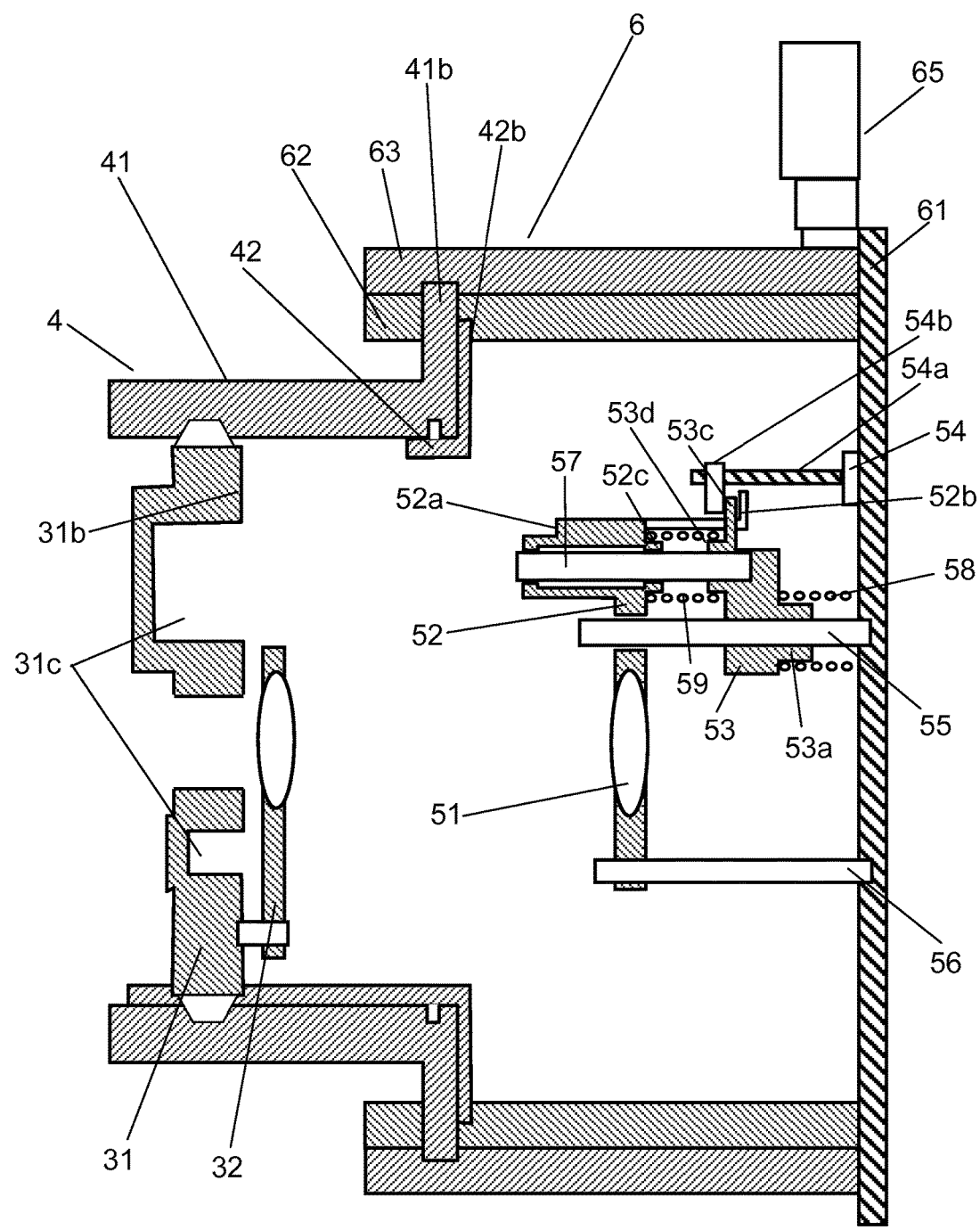
FIG. 9 is a view for describing of operation of the master flange unit in the lens barrel in accordance with this exemplary embodiment.
Figure 10:
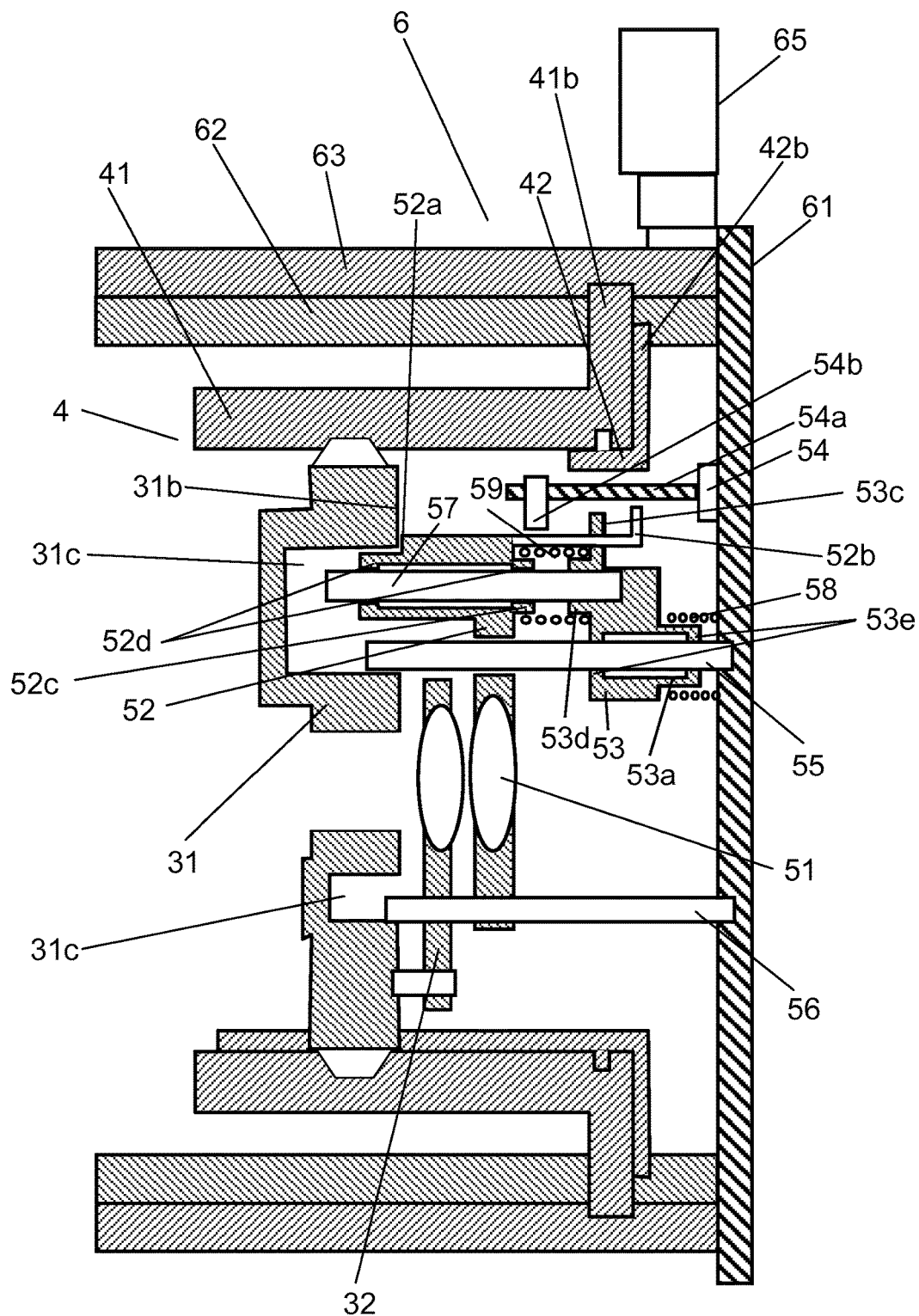
FIG. 10 is a view for describing of operation of the master flange unit in the lens barrel in accordance with this exemplary embodiment.
Figure 11:
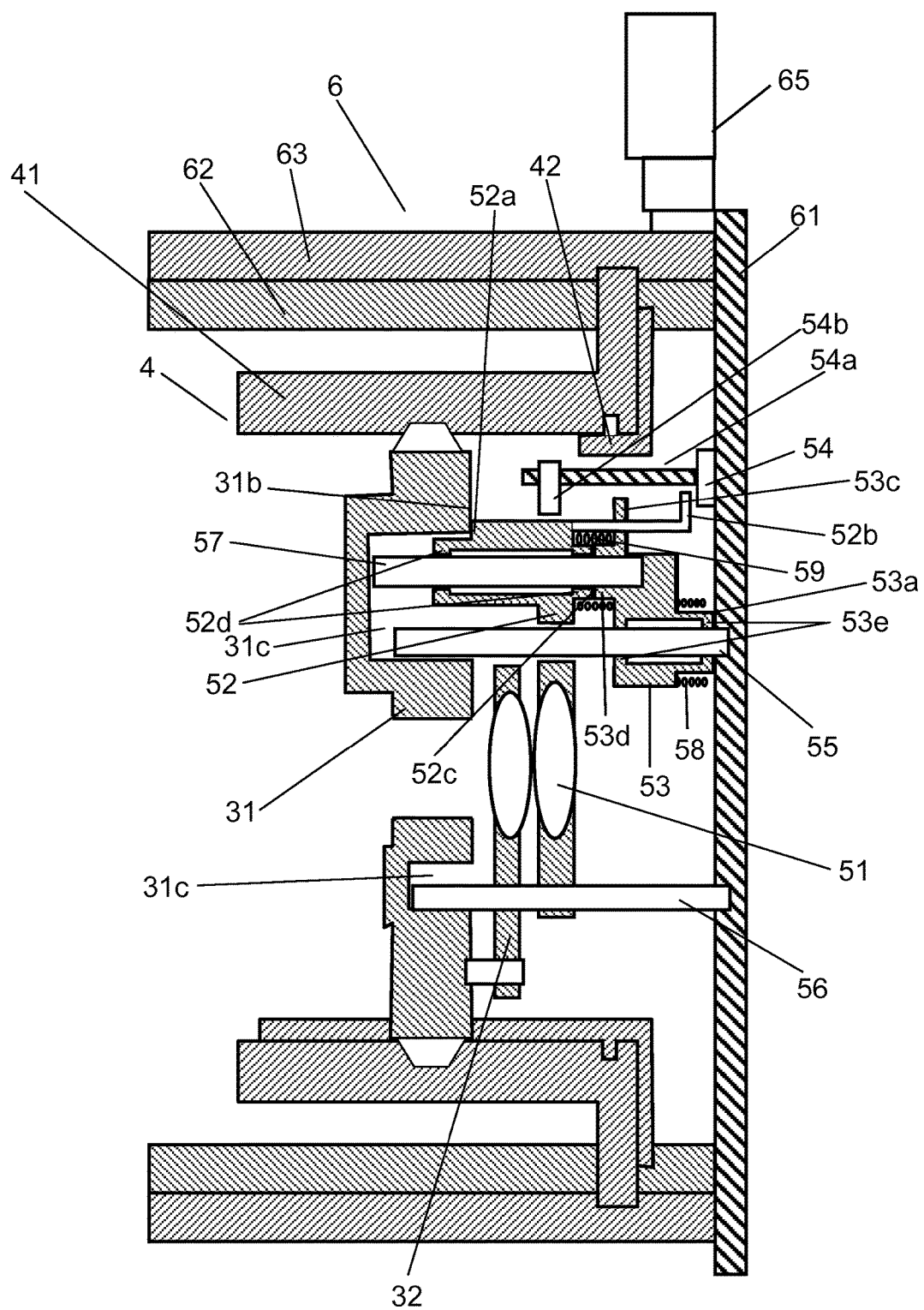
FIG. 11 is a view for describing of operation of the master flange unit in the lens barrel in accordance with this exemplary embodiment.
Figure 12:
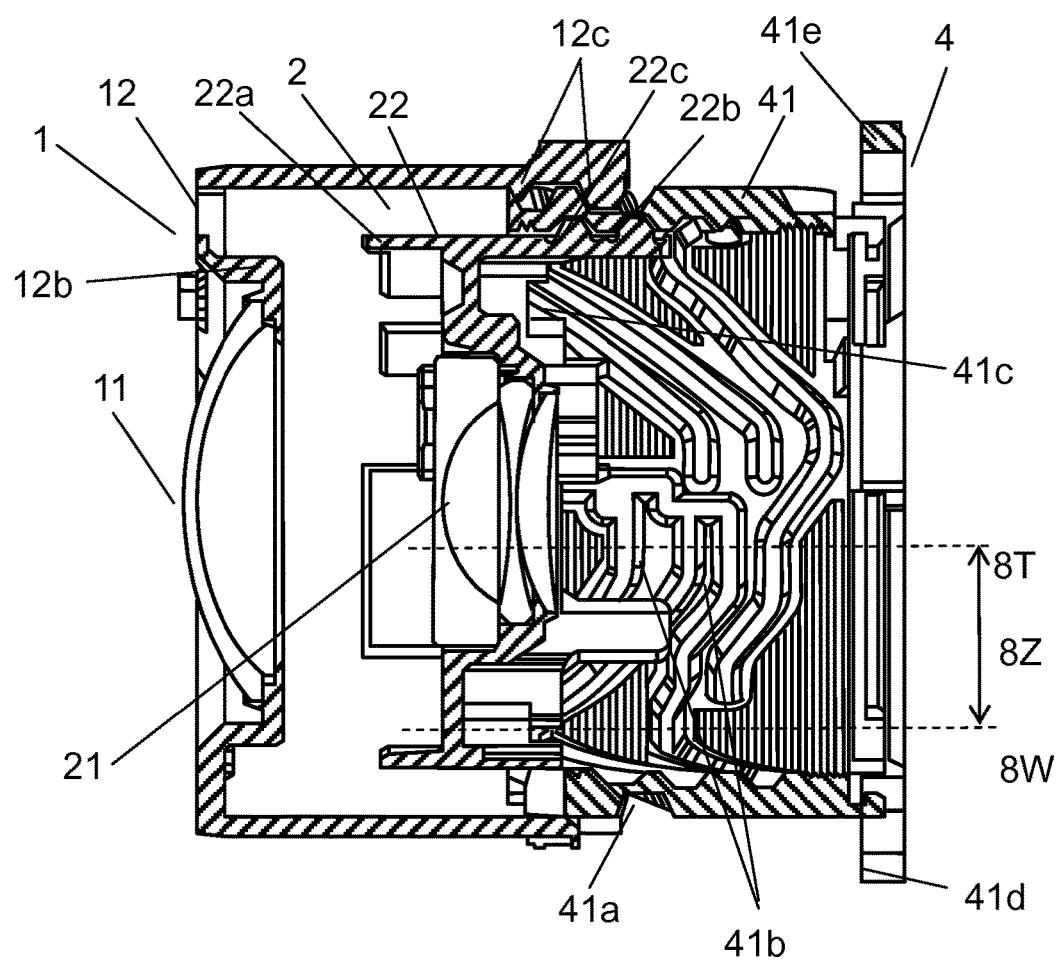
FIG. 12 is a sectional view for describing operation of the movable lens barrel unit section in the lens barrel in accordance with this exemplary embodiment.
Figure 13:
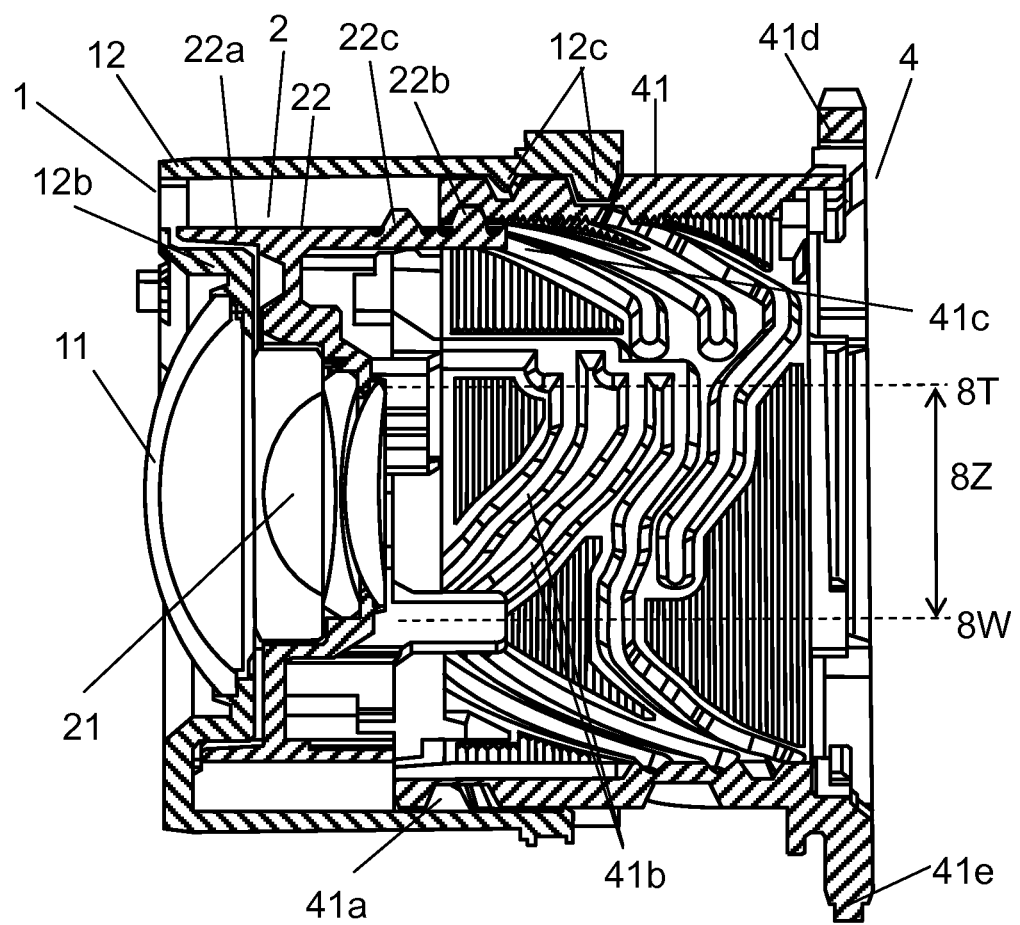
FIG. 13 is a sectional view for describing operation of the movable lens barrel unit section in the lens barrel in accordance with this exemplary embodiment.

FIG. 9, FIG. 10, and FIG. 11 are views for describing of operation of the master flange unit in the lens barrel in accordance with this exemplary embodiment. FIG. 9 is a view illustrating the lens barrel in the extended state, and FIG. 10 and FIG. 11 are views illustrating the lens barrel in the collapsed state. FIG. 12 and FIG. 13 are sectional views for describing operation of the movable lens barrel unit section in the lens barrel in accordance with this exemplary embodiment. FIG. 12 is a sectional view illustrating relation between the first group lens unit and the second group lens unit in a normal state (intermediate state between wide and telephoto), and FIG. 13 is a sectional view illustrating relation between the first group lens unit and the second group lens unit in a wide state.

[2-1. Operation of Master Flange Unit]

During use of focus fourth group lens unit 5, by activating zoom motor unit 65 of master flange unit 6, as illustrated in FIG. 9, movable lens barrel unit section 4 is extended from master flange unit 6.

In master flange unit 6, as illustrated in FIG. 9, hook 52b of fourth group lens frame 52 of fourth group lens unit 5 is in contact with projection 53c of moving frame 53 due to a repulsive force of coil spring 59. Projection 53c is in contact with pressing member 54b of focus motor unit 54 due to a repulsive force of coil spring 58.

In this state, by activating focus motor unit 54 as an actuator to move pressing member 54b toward master flange 61 in the optical axis direction, pressing member 54b of focus motor unit 54 presses moving frame 53 against the repulsive forces of coil springs 58, accordingly moving frame 53 and fourth group lens frame 52 move closer to master flange 61 in the optical axis direction. By activating focus motor unit 54 to move pressing member 54b away from master flange 61 in the optical axis direction, moving frame 53 and fourth group lens frame 52 move away from master flange 61. That is, fourth group lens unit 5 activates focus motor unit 54 as an actuator, thereby moving lens group 51 relative to master flange 61 in the optical axis direction, performing focusing.

To bring the lens barrel into the collapsed state, fourth group lens unit 5 and master flange unit 6 operate as illustrated in FIG. 10 and FIG. 11 in this order.

In the collapsed state, by activating zoom motor unit 65 of master flange unit 6, as illustrated in FIG. 10, movable lens barrel unit section 4 along with third group lens unit 3 moves to be stored in master flange unit 6. At this time, as illustrated in FIG. 10, contact 31b of shutter unit 31 of movable lens barrel unit section 4 comes into contact with contact 52a of fourth group lens frame 52 of fourth group lens unit 5 to press down fourth group lens frame 52 of fourth group lens unit 5 against the repulsive force of coil spring 59. When fourth group lens frame 52 is pressed down, a pressing force is transmitted to moving frame 53 via coil spring 59 and compresses coil spring 58 against the repulsive force of coil spring 58. Since the repulsive force of coil spring 58 is set smaller than the repulsive force of coil spring 59, coil spring 58 can be readily compressed.

When fourth group lens frame 52 of fourth group lens unit 5 is further pressed down, as illustrated in FIG. 11, both of coil springs 58, 59 are compressed, resulting in that moving frame 53 gets closer to master flange 61 and fourth group lens frame 52 gets closer to moving frame 53. Then, when stopper 53a of moving frame 53 comes into contact with master flange 61, fourth group lens frame 52 and moving frame 53 stop moving. At this time, end 52c of fourth group lens frame 52, at which coil spring 59 is disposed, is adapted so as to stop moving at a position where end 52c is not contact with end 53d of moving frame 53, at which coil spring 59 is disposed. Thus, even when stopper 53a of moving frame 53 of fourth group lens unit 5 comes into contact with master flange 61, fourth group lens frame 52 does not come into contact with moving frame 53, eliminating a mechanical stress to deform fourth group lens frame 52. In addition, OIS lens unit 32 of third group lens unit 3 does not come into contact with lens group 51 of fourth group lens unit 5.

As illustrated in FIG. 9 to FIG. 11, shutter unit 31 has recess 31c capable of storing support shafts 55, 56, and 57. This can prevent light incident from the subject side from entering into imaging device 7 from any place other than OIS lens unit 32 of shutter unit 31.

As illustrated in FIG. 9 and FIG. 10, projections 52d, 53e that can slidably come into contact with outer faces of support shafts 55, 57 are provided on inner faces of both ends of holes of fourth group lens frame 52 and moving frame 53, through which support shafts 55, 57 pass, respectively. Since projections 52d, 53e of fourth group lens frame 52 and moving frame 53 are slidably in contact with the outer faces of support shafts 55, 57, as compared to the case where the entire inner faces of the holes of fourth group lens frame 52 and moving frame 53 are in contact with the outer faces, loads exerted during movement of fourth group lens frame 52 and moving frame 53 on support shafts 55, 57 can be made smaller. Further, since projections 52d, 53e are formed at two positions on the both ends of the holes of fourth group lens frame 52 and moving frame 53, eccentricity and unsteadiness during movement of fourth group lens frame 52 and moving frame 53 on support shafts 55, 57 can be prevented, achieving a highly accurate operation of focus fourth group lens unit 5.

As illustrated in FIG. 7, and FIG. 9 to FIG. 11, fourth group lens frame 52 of fourth group lens unit 5 is supported by support shaft 57 fixed to moving frame 53, and another support shaft 56 that movably supports the portion of fourth group lens frame 52, which is opposed to support shaft 57 across lens group 51. For this reason, rotation of fourth group lens frame 52 about support shaft 57 as well as inclination of fourth group lens frame 52 about support shaft 57 relative to the optical axis can be limited, improving the positioning accuracy of focus fourth group lens unit 5.

As described above, the lens barrel of this technique includes movable lens barrel unit section 4 having first group lens unit 1 and second group lens unit 2, and master flange unit 6 having fourth group lens unit 5, and is configured to be switched between the collapsed state in which movable lens barrel unit section 4 is stored in master flange unit 6 and the extended state in which movable lens barrel unit section 4 is extended from master flange unit 6. Master flange unit 6 includes moving frame 53 supported to be movable in an optical axis direction via coil spring 58 as a first elastic member extendable in the optical axis direction relative to master flange 61 orthogonal to an optical axis, and fourth group lens frame 52 supported to be movable in the optical axis direction via coil spring 59 as a second elastic member extendable in the optical axis direction relative to moving frame 53. In the collapsed state, movable lens barrel unit section 4 presses fourth group lens frame 52 such that moving frame 53 and fourth group lens frame 52 get closer to master flange 61 against the repulsive forces of coil springs 58, 59.

With such a configuration, the entire length of the lens barrel in the collapsed state can be reduced and moreover, in the extended state during use of the lens barrel, a movable stroke of focus motor unit 54 for moving the focus lens unit can be reduced.

[2-1. Operation of Movable Lens Barrel Unit Section]

As illustrated in FIG. 12, FIG. 13, in zoom segment 8Z between wide 8W and telephoto 8T, in second group lens unit 2, at least two cams 22b, 22c of second group lens frame 22 slidably move in a plurality of second cam grooves 41b, 41c of cam frame 41. When cam frame 41 rotates, cams 22b, 22c of second group lens frame 22 slide and move in second cam grooves 41b, 41c, thus moving second group lens frame 22 in the optical axis direction. In first group lens unit 1, cam 12c of first group lens frame 12 slidably moves in first cam groove 41a of cam frame 41. When cam frame 41 rotates, cam 12c of first group lens frame 12 slides and moves in first cam groove 41a, thus moving first group lens frame 12 in the optical axis direction.

Through the above operation, the lens barrel can perform normal photographing and telephotographing using zooming.

As illustrated in FIG. 12, in the normal state of zoom segment 8Z, in second group lens frame 22 of second group lens unit 2, at least two cams 22b, 22c are located in both of second cam grooves 41b, 41c of cam frame 41. Thus, even when a force is applied to second group lens unit 2 from the subject side, since cams 22b, 22c engage with second cam grooves 41b, 41c, respectively, second group lens frame 22 can be prevented from falling out of cam frame 41.

Meanwhile, as illustrated in FIG. 13, in the wide state of zoom segment 8Z, second group lens frame 22 of second group lens unit 2 is maximally extended from cam frame 41. Second group lens frame 22 of second group lens unit 2 becomes closest to first group lens frame 12 of first group lens unit 1. At this time, only at least one cam 22b of second group lens frame 22 engages with second cam groove 41b of cam frame 41, and remaining cam 22c of second group lens frame 22 does not engage with second cam groove 41c of cam frame 41. However, in such a state, tip 22a of second group lens frame 22 externally engages with limiting unit 12b of first group lens frame 12. Thus, even in the wide state where second group lens frame 22 of second group lens unit 2 is maximally extended from cam frame 41, tip 22a of second group lens frame 22 externally engages with limiting unit 12b of first group lens frame 12, preventing second group lens frame 22 from falling out of cam frame 41.

As described above, the lens barrel of this technique includes movable lens barrel unit section 4 having first group lens unit 1 and second group lens unit 2, and master flange unit 6 having the lens unit, and is switched between the collapsed state where movable lens barrel unit section 4 is stored in master flange unit 6 and the extended state where movable lens barrel unit section 4 is extended from master flange unit 6. First group lens unit 1 and second group lens unit 2 have first group lens frame 12 and second group lens frame 22 each holding the lens group, respectively. Movable lens barrel unit section 4 has cam frame 41, and cam frame 41 has second cam grooves 41b, 41c engageable with cams 22b, 22c of second group lens frame 22, respectively. Second group lens frame 22 further has tip 22a that engages with limiting unit 12b as a part of first group lens frame 12 when second group lens frame 22 gets closer to first group lens frame 12.

Such a configuration can reduce lengths of cam frame 41 and rotation-limiting frame 42 in the optical axis direction. Moreover, since second group lens frame 22 has tip 22a that engages with a part of first group lens frame 12 when second group lens frame 22 gets closer to first group lens frame 12, even when the extension distance from cam frame 41 and rotation-limiting frame 42 is large, second group lens frame 22 can be prevented from falling out from cam frame 41, improving the holding strength of second group lens frame 22.

Other Exemplary Embodiments

The exemplary embodiment has been described above as an example of this technique. However, this technique is not limited to the exemplary embodiment, and may be also applied to other exemplary embodiments appropriately subjected to modifications, replacements, addition, or omissions.

For example, third group lens unit 3 may be formed of only shutter unit 31 without OIS lens unit 32. First elastic member and second elastic member each may be formed of a spring other than coil springs 58, 59, and may be combined with a buffer member such as a suspension. In each lens unit, a number of lenses constituting the lens group is not limited to the above exemplary embodiment, and may be one or more lenses that satisfy required optical characteristics.

Therefore, components illustrated in appended drawings and detailed description can include components required to solve problems, as well as components that are not essential to solve the problems but illustrate the above technique. For this reason, if those unnecessary components are described in the appended drawings and the detailed description, it should not be acknowledged that such fact directly founds that the unnecessary components are necessary.

The exemplary embodiment serves to illustrate this technique, and may be subjected to various modifications, replacements, addition, or omissions in claims and their equivalents.

This technique can be also applied to imaging apparatus and onboard cameras including lens barrel-integrated digital still cameras, and lens-exchangeable cameras using a lens barrel as an exchange lens.

What is claimed is:

1. A lens barrel comprising:
a movable lens barrel unit section; and
a master flange unit including a lens unit,
the lens barrel being configured to be switched between a collapsed state in which the movable lens barrel unit section is stored in the master flange unit, and an extended state in which the movable lens barrel unit section is extended from the master flange unit, wherein
the master flange unit includes a moving frame supported to be movable in an optical axis direction via a first elastic member extendable in the optical axis direction relative to a master flange orthogonal to an optical axis, and a lens frame supported to be movable in the optical axis direction via a second elastic member extendable in the optical axis direction relative to the moving frame and holding a lens of the lens unit,
in the collapsed state, the movable lens barrel unit section presses the lens frame such that the moving frame and the lens frame get closer to the master flange against repulsive forces of the first elastic member and the second elastic member, and
in the extended state, the master flange is disposed closer to an imaging surface than the moving frame, and the moving frame is disposed closer to the imaging surface than the lens frame.

2. The lens barrel according to claim 1, wherein the master flange unit includes an actuator for moving the moving frame and the lens frame in the optical axis direction, and the actuator has a pressing member for pressing the moving frame and the lens frame against the repulsive forces of the first elastic member and the second elastic member.

3. The lens barrel according to claim 1, wherein a repulsive force of the first elastic member is set smaller than a repulsive force of the second elastic member.

4. The lens barrel according to claim 1, wherein the lens frame is supported by a support shaft fixed to the moving frame, and another support shaft for movably supporting a portion opposed to the support shaft across the lens.

5. The lens barrel according to claim 1, wherein the master flange unit includes an actuator for moving the moving frame and the lens frame in the optical axis direction, and the actuator includes a pressing member, wherein
when the pressing member moves in the direction of the optical axis so as to approach the master flange, the moving frame is pressed by the pressing member against the repulsive force of the first elastic member, and the lens frame moves in the optical axis direction so as to approach the master flange.

6. A lens barrel comprising:
a movable lens barrel unit section; and
a master flange unit including a lens unit,
the lens barrel being configured to be switched between a collapsed state in which the movable lens barrel unit section is stored in the master flange unit, and an extended state in which the movable lens barrel unit section is extended from the master flange unit, wherein
the movable lens barrel unit section includes a first group lens unit and a second group lens unit, the first group lens unit and the second group lens unit having a first group lens frame and a second group lens frame, respectively, for holding the respective lens groups,
the movable lens barrel unit section includes a cam frame having a cam groove engageable with a cam of the second group lens frame, and
the second group lens frame has a tip engageable with a part of the first group lens frame when the second group lens frame gets closer to the first group lens frame.

7. The lens barrel according to claim 6, wherein
the cam frame has a cam groove in an outer peripheral face, the cam groove being engageable with a cam of the first group lens frame, and has a cam groove in an inner peripheral face, the cam groove being engageable with the cam of the second group lens frame, and the cam frame is rotated to move the first group lens frame and the second group lens frame in the optical axis direction.

8. The lens barrel according to claim 6, wherein
the second group lens frame has at least two cams, the cam frame has a plurality of cam grooves engageable with the cams, and when at least one of the cams of the second group lens frame engages with the cam groove of the cam frame, the tip of the second group lens frame engages with the part of the first group lens frame.

9. A lens barrel comprising:
a movable lens barrel unit section; and
a master flange unit including a lens unit,
the lens barrel being configured to be switched between a collapsed state in which the movable lens barrel unit section is stored in the master flange unit, and an extended state in which the movable lens barrel unit section is extended from the master flange unit, wherein:

the master flange unit includes a moving frame supported to be movable in an optical axis direction via a first elastic member that is extendable in the optical axis direction relative to a master flange orthogonal to an optical axis, a lens frame supported to be movable in the optical axis direction via a second elastic member that is extendable in the optical axis direction relative to the moving frame and that is holding a lens of the lens unit and an actuator includes and activates a pressing member which is movable in the optical axis direction;

in the collapsed state, the pressing member does not abut on the moving frame and the movable lens barrel unit section presses the lens frame such that the moving frame and the lens frame get closer to the master flange against repulsive forces of the first elastic member and the second elastic member; and in the extended state, when the actuator moves the pressing member which abuts on the moving frame, the lens frame moves in the optical axis direction as the moving frame moves so that the actuator performs a focusing operation.

* * * * *